United States Patent
Fan

Patent Number: 5,900,952
Date of Patent: May 4, 1999

[54] SYSTEM FOR CONVERTING COLOR IMAGE SIGNALS HAVING HIGH-FREQUENCY COMPONENTS FROM RGB TO CMY COLOR SPACES

[75] Inventor: Zhigang Fan, Webster, N.Y.

[73] Assignee: Xerox Corporation, Stamford, Conn.

[21] Appl. No.: 08/730,048

[22] Filed: Oct. 15, 1996

[51] Int. Cl.[6] .................. G03F 3/08; H04N 9/64; H04N 9/77; H04N 5/21

[52] U.S. Cl. .................. 358/518; 358/518; 358/515; 358/500; 358/529; 348/708; 348/617; 348/712; 386/2

[58] Field of Search .................. 358/518, 515, 358/500, 529, 504

[56] References Cited

U.S. PATENT DOCUMENTS

| | | |
|---|---|---|
| 4,887,150 | 12/1989 | Chiba et al. .................. 358/530 |
| 5,032,903 | 7/1991 | Suzuki et al. .................. 358/530 |
| 5,077,604 | 12/1991 | Kivolowitz et al. .................. 358/75 |
| 5,087,126 | 2/1992 | Pochieh .................. 356/402 |
| 5,293,228 | 3/1994 | Marti .................. 348/391 |
| 5,528,386 | 6/1996 | Rolleston et al. .................. 358/522 |
| 5,555,031 | 9/1996 | Van Rooj .................. 348/645 |
| 5,572,632 | 11/1996 | Laumeyer et al. .................. 395/116 |

*Primary Examiner*—Edward L. Coles
*Assistant Examiner*—Twyler Lamb
*Attorney, Agent, or Firm*—R. Hutter

[57] ABSTRACT

A system for converting original RGB color signals to CMY signals includes the step of separating color signals from the original image into low-frequency and high-frequency components. The low-frequency components are converted to CMY signals via a look-up table reflective of a non-linear algorithm, while the high-frequency components are converted to CMY signals according to linear algorithms. The technique avoids color distortion caused by high-frequency noise, such as from halftone screens, in the original image.

11 Claims, 2 Drawing Sheets

SYSTEM FOR CONVERTING COLOR IMAGE SIGNALS HAVING HIGH-FREQUENCY COMPONENTS FROM RGB TO CMY COLOR SPACES

The present invention relates to a system for converting calorimetric image signals of one type, such as using RGB primary colors, to calorimetric signals of a second type, such as CMY or CMYK.

In the printing of color images based on electronic signal image signals, whether those electronic image signals derive from a hard-copy scanner or are synthesized from an electronic document, it is a well-known necessity to render the calorimetric image signal forming the image in a color space which is suitable for printing. For scanning from a hard-copy original, the original calorimetric signals derived from the hard-copy image are typically in a red-green-blue (RGB) color space; however, most general-purpose color printing apparatus, whether electrostatographic or otherwise, require that the calorimetric signal applied to cyan-magenta-yellow (CMY) or cyan-magenta-yellow-black (CMYK) color space. Most full-color xerographic printers, for example, have supplies of cyan, magenta, yellow, and black toner, different proportions of which are applied to different portions of an image to obtain subtle gradations of color in the visible spectrum.

There exists in the prior art any number of systems and methods for performing the conversion of original RGB-based image signals to CMY or CMYK-based image signals which can be applied directly to a digital printing apparatus. Among these patents in the prior art are U.S. Pat. Nos. 5,077,604; 5,087,126; and 5,528,386. To one extent or another, each of these prior art systems and methods generally involve applying the original RGB signals to one or another systems of look-up tables by which the RGB signals are converted to CMY or CMYK signals.

In a practical context of full-color digital image processing and printing, a common source of original full-color images are images which have been previously printed, such as by lithography. In lithography and in other similar printing techniques, halftone areas are created in the image by screens of small dots interspaced with unprinted areas, so that, viewed from a distance where the spots are not apparent, the desired halftones are obtained. However, when such halftone screens are scanned by a digital input scanner, for example, having a linear array of photosensors, the fact that certain of the spots in the halftone screen will be aligned with a single photosensor and other spots will not, will lead to highly noisy image signals, particularly in rendering colors obtained by overlapping halftone screens of primary colors. Another source of noisy image signals are highly-textured images, such as of grasses, bushes, and textiles.

A significant source of color distortion in recording color images in a raster input scanner derives from the fact that multi-dimensional look-up tables, which are well-known in the art for performing the conversion of color signals from RGB to CMY usually represent non-linear functions, which distort the "average" color signals which are perceived by the eye when the signals are noisy. FIG. 3 is an example graph showing a non-linear relationship between an RGB color signal entering a system, when it is converted to an equivalent CMY color signal, as shown on the y-axis. The presence of high-frequency noise in an original image, such as would be caused by halftone screens in the original image, will cause signals from an area of the original image of a particular color to occupy a "band" of RGB signals, depending on the amplitude of the noise. This band, shown along the x-axis of the graph of FIG. 3, may correspond to a considerably wider band variation in the output CMY signal. Further, an average RGB signal within the band, which would be located at the center of the band along the x-axis, will correspond to a CMY value which is not necessarily in the middle of the band along the y-axis. Since, over a large area of pixels, the human eye detects the average of signals within a band, the fact that the average signal within the band is displaced in the CMY output along the y-axis will cause the perceived output, as shown on a color copy, for example, to be of a perceptibly different color than the scanned-in RGB original.

It is an object of the present invention to provide a system whereby the high-frequency noise, which is typically created by the use of halftone screens in original images, can be compensated for in color-space conversion.

In the prior art, U.S. Pat. No. 4,887,150 discloses a device for converting RGB image signals first into CMY image signals, and then into CMYK signals.

U.S. Pat. No. 5,032,903 discloses an "edge processing system" for use in color image processing. Requirements of printing different images, such as halftones and blocks of text characters, may require different image-processing techniques to prevent, for example, image degradation such as varying line thickness. The system comprises a low-pass digital filter for eliminating mesh dot components of a halftone image and a high-pass digital filter for detecting an edge part composed of high frequency components.

U.S. Pat. No. 5,079,621 discloses a system for compressing data relating to color images. The discrete cosine transform (DCT) compression technique divides an image into DC, or low-pass, and high-pass components. These components can be weighted against a model of the visual system.

U.S. Pat. No. 5,087,967 discloses a system for processing a color video signal. A low-pass filter receiving the color video signal generates a luminance signal to which is added an outline component which is derived from a bandpass filter. The overall purpose of this system is to compensate for an aliasing noise caused by a disparity between the frequency of the video signal and the sampling frequency of a charge-coupled device creating the image.

U.S. Pat. No. 5,187,570 discloses a system for converting color image signals from one type to another, such as RGB to CMY. The system uses linear compression to convert values from one type of color signal to the other.

U.S. Pat. No. 5,270,808 discloses a system for converting RGB signals to a CMYK signals in a digital system. An average value is calculated over plural pixels in the vicinity of an object pixel to be digitized, and plural average values are then obtained by including the object pixel selected at each of the reproducible colors. This operation creates a digitization error, which is corrected by distributing the error to succeeding pixels with weighted ratios.

U.S. Pat. No. 5,293,228 discloses a system for converting RGB to CMY signals, in which a luminance signal is formed by a linear combination of the RGB signal. At least one color signal and the luminance signal are digitized, sampled at the same resolution, and subjected to a reversible mathematical transformation in the frequency domain.

U.S. Pat. No. 5,343,311 discloses a method for efficiently handling color image data. Each pixel of the image data includes color components, the signals of which are translated to the color space of a plurality of volume elements which together contain at least a portion of a color space.

U.S. Pat. No. 5,483,360 discloses a method of calibrating a color printer. First the color printer is operated to print color samples on a particular medium. The color samples are then optically measured to determine a colorimetic response of the printing apparatus to the printer signals.

According to the present invention, there is provided a method of converting color signals of a first type to equivalent color signals of a second type, the color signals being derived from an image having a plurality of pixels arranged in two-dimensional space. A series of color signals based on pixels of the image are separated into low-frequency components and high—frequency components. The low-frequency components are converted from color signals of the first type to color signals of the second type, according to a first algorithm. The high-frequency components are converted from color signals of the first type to color signals of the second type, according to a second algorithm which is different from the first algorithm.

Figure 1:
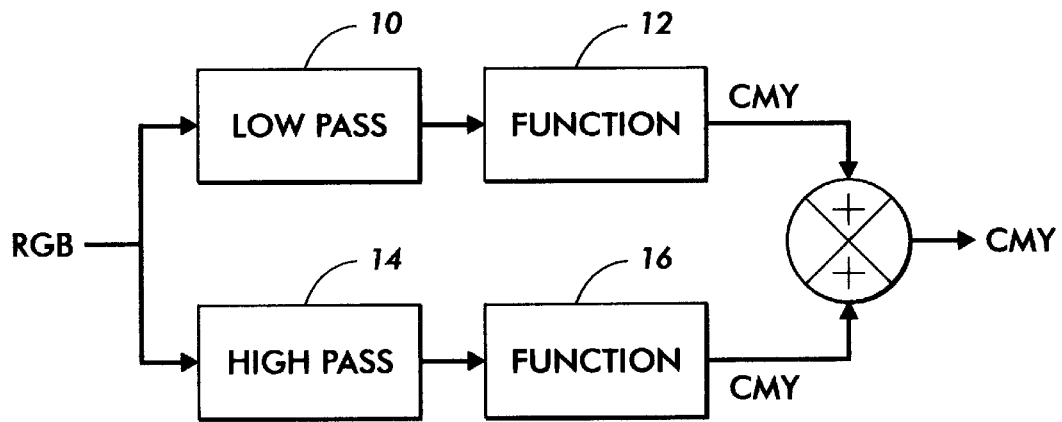
FIG. 1 is a systems diagram illustrating one embodiment of the method of the present invention.

FIG. 1 is a simplified systems diagram showing the basic functionality of the present invention. The overall system of FIG. 1 is intended for conversion of RGB color signals to CMY signals, although it will be understood that the entire description hereof can be applied to a system which converts CIELAB-based color signals to CMY, or indeed can conceivably be used to convert signals from any color space to any other color space.

As shown in the Figure, the method of the present invention takes the original RGB signals from an image, such as from a hard-copy full-color image scanned into a system via an input scanner having an array of photosensors, and separates the original image into "low-frequency" and "high-frequency" components. By these two terms is meant that, as one moves in a line across a representative two-dimensional image, the rapid changes in color signals along that line, such as at the pixel level, will be recorded as high-frequency components, while more long-term changes in color as one moves along the line, such as at the millimeter-to-centimeter level, will be considered low-frequency components of the signal. In effect, the purpose of this separation is to separate those components of the image which are apparent to the human eye viewing the image from a reasonable distance, as opposed to those changes in color which are not intended to be detected by the human eye viewing the image at a reasonable distance; in this latter category, of course, would be the high-frequency changes in intensity caused by halftone screens, which are intended not to be noticed by the casual human observer.

Once the low-frequency components and the high-frequency components are separated from each other from the original RGB signals derived from the image, the low-frequency components of the image, such as derived from a low-pass filter 10, are converted to CMY signals via a first function, indicated as 12. Simultaneously, the high-frequency components of the signal, such as separated by a high-pass filter 14, are converted to CMY signals by a separate, second function 16, which is different from the function 12 which converts the low-frequency components. These two types of CMY signals can then be recombined to yield a final CMY signal. This final CMY signal can then be subjected to other image-processing techniques such as undercolor removal, and then the resulting signals used, for example, to operate a digital printing apparatus.

The systems diagram of FIG. 1 is provided on the assumption that the RGB signal derived from an original image are available in a "stream" which is read over time, the passage of time being related to reading the various pixels in series starting from one corner of the image and proceeding through the entire image. Such a stream can be created, for example, by reading out the image data which has been stored in an electronic memory in a particular order. It will also be apparent that other techniques of separating high-frequency and low-frequency components from an image, particularly in a two-dimensional context, are feasible.

According to a preferred embodiment of the present invention, the function 12 for converting low-frequency RGB signals to CMY signals is a non-linear function, which in practical terms may be in the form of a look-up table representing such a non-linear function. Multi-dimensional look-up tables for performing this RGB to CMY conversion are known in the art. Further according to a preferred embodiment of the present invention, the function 16 for converting the high-frequency components from RGB to CMY is a linear function, in which there is a direct substitution, for example, of a signal of one primary color, such as red, with a complementary signal of its complementary CMY color, such as cyan.

Figure 2:
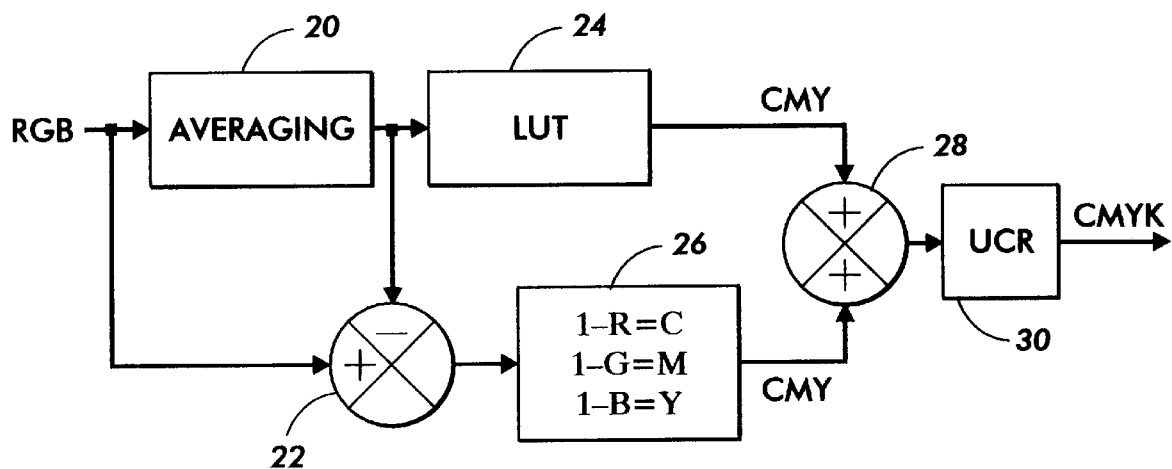
FIG. 2 is a systems diagram illustrating a preferred method according to the present invention.
Figure 3:
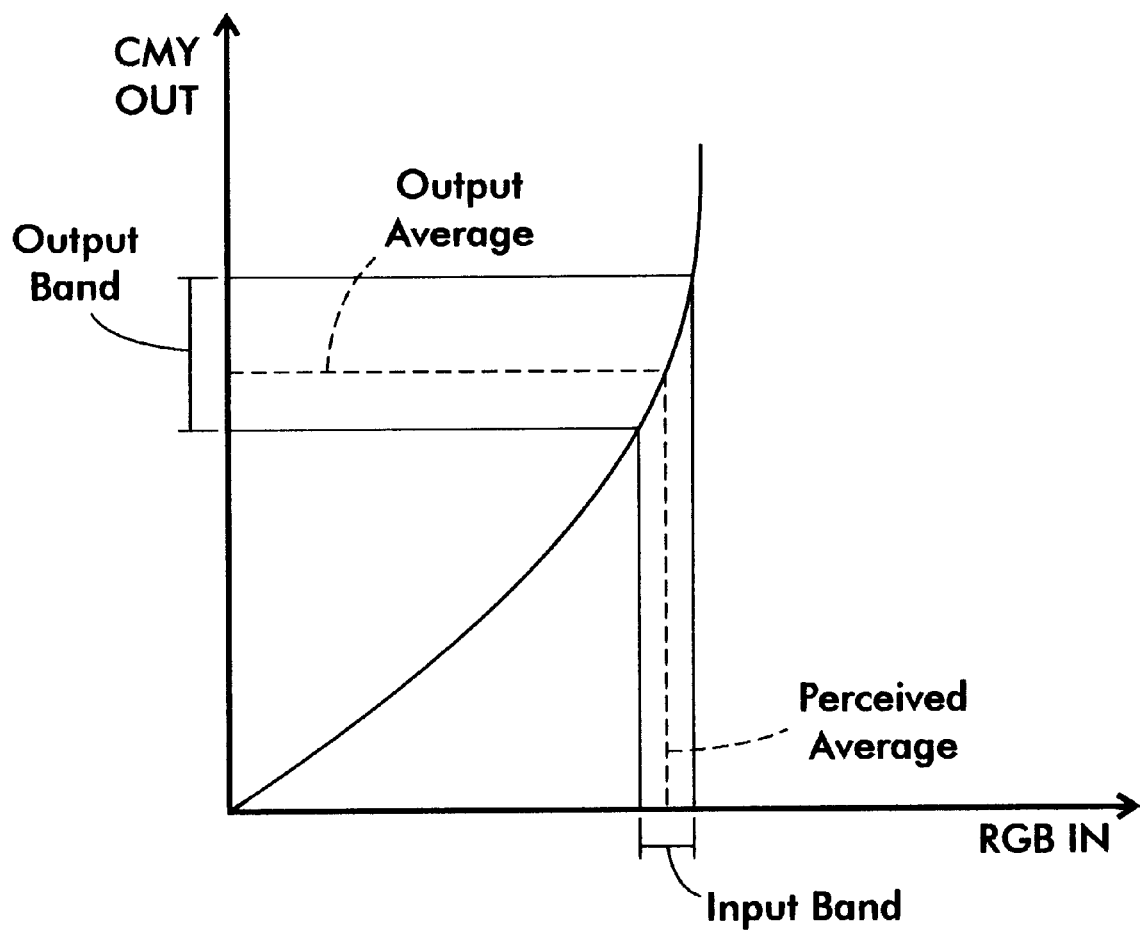
FIG. 3 is a graph illustrating the principle of distortion of average color in a non-linear conversion function between RGB and CMY signals.

FIG. 2 is a systems diagram showing a preferred embodiment of the present invention. As in FIG. 1, the original RGB signals are separated into low-frequency and high-frequency components. In the FIG. 2 embodiment, this separation is caused by taking, for each sample pixel in the image, an average of intensity of each primary color signal for a predetermined set of neighboring pixels in the image. A typical set of pixels to be averaged would be a 3×3 or 5×5 block of pixels around a particular sample pixel. Another technique for finding an average value of a particular neighborhood of pixels is to use the discrete cosine transform (DCT) of, for example, every 8×8 block of pixels in the original image; as it happens, this DCT technique, which yields a vector of average color signal for every 8×8 block of pixels, is performed incidental to a JPEG compression technique which is common in the art. (Such a DCT technique, because it also separates out the AC coefficients for each block of pixels, can be used as a high-pass filter as well.) The high-frequency component of the original RGB signal string can be obtained simply be subtracting the low-frequency component from the original raw RGB signal stream, such as shown by subractor 22. Subtracting the low-frequency component from the original signal will, of course, simply leave the high-frequency component as a remainder. Once this separation is achieved, the low-frequency component from function 20 is then applied to a look-up table 24, where the RGB signals are converted to CMY signals. As mentioned above, the low-frequency component is preferably converted with a non-linear algorithm, and such an algorithm would be reflected in the values of look-up table 24.

Simultaneously, the high-frequency components of the signal, coming from subtractor 22 are preferably converted to CMY signal by a linear function, such as the triplet of functions shown within function 26 in the Figure. As can be seen, each RGB primary color signal is simply substituted with a complementary signal of its complementary CMY primary color.

As shown at summer 28, the CMY signals from look-up table 24 added to, or otherwise combined with, the CMY signals from function 26. This summing results in a final CMY figure representative of the two types of conversion algorithms. The final CMY signals from summer 28 can then be subjected to an undercolor removal (UCR) function such as indicated by 30, yielding CMYK signals. These CMYK signals can, in turn, be used ultimately to operate xerographic or ink-jet full-color digital printing equipment.

While the invention has been described with reference to the structure disclosed, it is not confined to the details set forth, but is intended to cover such modifications or changes as may come within the scope of the following claims.

I claim:

1. A method of converting color signals of a first type, said color signals derived from an image having a plurality of pixels arranged in two-dimensional space associated therewith, to equivalent color signals of a second type, comprising the steps of:

separating a series of color signals based on pixels from the image into low-frequency components and high-frequency components;

converting the low-frequency components from color signals of said first type to color signals of said second type according to a first algorithm; and converting the high-frequency components from color signals of said first type to color signals of said second type according to a second algorithm different from the first algorithm.

2. The method of claim 1, further comprising the steps of recombining the color signals of the second type converted from the low-frequency components with the color signals of the second type converted from the high-frequency components, thereby yielding a final set of signals of the second type.

3. The method of claim 1, wherein the first algorithm describes a non-linear function.

4. The method of claim 1, wherein the second algorithm describes a linear function.

5. The method of claim 1, wherein the signals of the first type are in RGB color space.

6. The method of claim 1, wherein the signals of the second type are in CMY color space.

7. The method of claim 1, wherein the signals of the first type are in CIELAB color space.

8. The method of claim 1, further comprising the steps of recombining the color signals of the second type converted from the low-frequency components with the color signals of the second type converted from the high-frequency components, thereby yielding a final set of signals of the second type; and performing undercolor removal on the final set of signals of the second type.

9. The method of claim 1, wherein the separating step includes the step of for a plurality of pixels from the original image, determining an average of color signals of the first type of a predetermined set of neighboring pixels in the image, thereby yielding a series of low-frequency components.

10. The method of claim 1, wherein the separating step includes the steps of for a plurality of sets of pixels in the image, performing a discrete cosine transform on a set of pixels on the original image, thereby yielding a DC component of the set of pixels; and deriving the low-frequency components from a series of DC components.

11. The method of claim 1, wherein the separating step includes the steps of deriving the low-frequency components from the original image; and subtracting the low-frequency components from color signals derived directly from the image, thereby obtaining the high-frequency components.

* * * * *